United States Patent
Nagase et al.

(10) Patent No.: US 10,884,435 B2
(45) Date of Patent: Jan. 5, 2021

(54) PRESSURE TYPE FLOW RATE CONTROL DEVICE, AND FLOW RATE CALCULATING METHOD AND FLOW RATE CONTROL METHOD FOR SAME

(71) Applicant: FUJIKIN INCORPORATED, Osaka (JP)

(72) Inventors: Masaaki Nagase, Osaka (JP); Kaoru Hirata, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 16/327,305

(22) PCT Filed: Aug. 24, 2017

(86) PCT No.: PCT/JP2017/030251
§ 371 (c)(1),
(2) Date: Feb. 21, 2019

(87) PCT Pub. No.: WO2018/038193
PCT Pub. Date: Mar. 1, 2018

(65) Prior Publication Data
US 2019/0227577 A1    Jul. 25, 2019

(30) Foreign Application Priority Data
Aug. 24, 2016    (JP) ................... 2016-163883

(51) Int. Cl.
*G05D 7/06* (2006.01)
*G01F 1/50* (2006.01)
*G05B 19/416* (2006.01)

(52) U.S. Cl.
CPC ............ *G05D 7/0617* (2013.01); *G01F 1/50* (2013.01); *G05B 19/416* (2013.01);
(Continued)

(58) Field of Classification Search
None
See application file for complete search history.

(56) References Cited

U.S. PATENT DOCUMENTS

| | | | |
|---|---|---|---|
| 2001/0004903 A1* | 6/2001 | Ohmi | G05D 7/0664 137/613 |
| 2007/0204702 A1* | 9/2007 | Melcer | G01F 15/043 73/861 |
| 2014/0246097 A1* | 9/2014 | Smirnov | G05D 7/0629 137/10 |

FOREIGN PATENT DOCUMENTS

| | | |
|---|---|---|
| JP | H08-338546 A | 12/1996 |
| JP | 2000-322130 A | 11/2000 |

OTHER PUBLICATIONS

Engineering tool box (Gas Mixture Properties), May 2, 2006, retrieved from the internet <https://web.archive.org/web/20060502200956/https://www.engineeringtoolbox.conn/gas-mixture-properties-d_586.html> (Year: 2006).*

(Continued)

*Primary Examiner* — Kenneth M Lo
*Assistant Examiner* — Istiaque Ahmed
(74) *Attorney, Agent, or Firm* — Studebaker & Brackett PC

(57) ABSTRACT

A pressure-type flow rate control device 1, while maintaining an upstream pressure P1 of an orifice 5 at approximately at least twice a downstream pressure P2, calculates a flow factor FF of a mixed gas consisting of two types of gases mixed at a mixture ratio of X:(1−X) by $FF=(k/\rho)\{2/(\kappa+1)\}^{1/(\kappa-1)}[\kappa/\{(\kappa+1)R\}]^{1/2}$ using an average density $\rho$, an average specific heat ratio $\kappa$, and an average gas constant (Continued)

R of the mixed gas that are calculated by weighting the densities, specific heat ratios, and gas constants of the two types of gases at the mixture ratio, and calculates a flow rate Q of the mixed gas passing through the orifice by $Q=FF \cdot S \cdot P_1 (1/T_1)^{1/2}$, where S is the orifice cross section, and $P_1$ and $T_1$ are respectively the pressure and temperature of the mixed gas on the upstream side of the orifice.

4 Claims, 3 Drawing Sheets

(52) U.S. Cl.
CPC . *G05D 7/0635* (2013.01); *G05B 2219/37371* (2013.01); *G05B 2219/37399* (2013.01)

(56) References Cited

OTHER PUBLICATIONS

Jim Buckley, (specific heat ratio of a gas mixture), May 7, 2009, retrieved from the internet <https://www.eng-tips.com/ viewthread.cfm?qid=244590> (Year: 2009).*
International Search Report issued in PCT/JP2017/030251; dated Sep. 26, 2017.

* cited by examiner

PRESSURE TYPE FLOW RATE CONTROL DEVICE, AND FLOW RATE CALCULATING METHOD AND FLOW RATE CONTROL METHOD FOR SAME

TECHNICAL FIELD

The present invention relates to a pressure-type flow rate control device used in facilities such as semiconductor manufacturing facilities and chemical plants, and a flow rate calculation method and a flow rate control method thereof, and in particular relates to a pressure-type flow rate control device used for supplying a mixed gas that is a mixture of a plurality of types of gases, and a flow rate calculation method and a flow rate control method thereof.

BACKGROUND ART

The ability to supply gas accurately is required in facilities such as semiconductor manufacturing facilities or chemical plants. As one example of gas flow rate control devices, mass flow controllers (thermal mass flow rate controllers) are known.

As gas flow rate control devices having a simpler configuration than thermal mass flow rate controllers, based on a different principle, pressure-type flow rate control systems are known. For example, Patent Literatures 1 and 2 given below disclose pressure-type flow rate control devices that adjust the flow rate of input gas with a control valve and exhaust the gas through an orifice. These pressure-type flow rate control devices control a flow rate Q of gas by measuring an upstream pressure $P_1$ of the orifice when the relationship between the upstream pressure $P_1$ and a downstream pressure $P_2$ of the orifice satisfies a predetermined condition. Assuming that the flow velocity of the gas when flowing out of the orifice reaches sound velocity at the gas temperature thereof, i.e., when the relationship between the upstream and downstream pressures $P_1$ and $P_2$ of the orifice satisfies a critical expansion condition $P_1/P_2 \geq$ approx. 2, the flow rate Q is expressed as $Q = FF \cdot S \cdot P_1 (1/T_1)^{1/2}$ and is proportional to the upstream pressure $P_1$, where FF is the flow factor ($m^3 K^{1/2}$/kg sec) expressed as:

$$FF = (k/\gamma_s)\{2/(\kappa+1)\}^{1/(\kappa-1)}[\kappa/\{(\kappa+1)R\}]^{1/2}.$$

Here, k is a constant ($k = (2 g)^{1/2} = 4.429$, where g is the acceleration of gravity (m/sec$^2$)), Q(m$^3$/sec) is the volume flow rate under standard conditions, S (m$^2$) is the orifice cross section, $P_1$ (kg/m$^2$abs) is the upstream absolute pressure, $T_1$ (K) is the upstream gas temperature, $\gamma_s$ (kg/m$^3$) is the gas density under standard conditions, $\kappa$ (dimensionless) is the gas specific heat ratio, and R (m/K) is the gas constant.

Therefore, a desired flow rate can be obtained by measuring the upstream pressure $P_1$ to calculate the flow rate Q and controlling the control valve such that the calculated flow rate Q becomes the desired flow rate.

CITATION LIST

Patent Literature

Patent Literature 1: Japanese Patent Application Laid-Open No. H08-338546
Patent Literature 2: Japanese Patent Application Laid-Open No. 2000-322130

SUMMARY OF INVENTION

Technical Problem

The control methods for obtaining a desired flow rate by measuring the upstream pressure $P_1$ of the orifice to calculate the flow rate of the gas, disclosed in Patent Literatures 1 and 2, are applicable to a single type of gas, but cannot be applied to a mixed gas. This is because the flow factor FF includes characteristic values (density $\gamma_s$, specific heat ratio $\kappa$, and gas constant R) of each type of gases.

It is thus conceivable to obtain a value by weighting (hereinafter, also referred to as "multiplying") the flow factor FF of each type of gases constituting the mixed gas at the ratio at which these types of gases are mixed and to use the obtained value as the flow factor FF of the mixed gas. For example, for a mixed gas consisting of gas A and gas B, it is conceivable to calculate the flow factor FF(AB) of the mixed gas by:

$$FF(AB) = X \cdot FF(A) + (1-X) \cdot FF(B)$$

and calculate the flow rate Q by:

$$Q = FF(AB) \cdot S \cdot P_1 (1/T_1)^{1/2}$$

where X ($0 \leq X \leq 1$) is the proportion of the gas A and (1−X) is the proportion of the gas B, i.e., the proportion of the gas A to the gas B is X:(1−X), and FF(A) and FF(B) are the flow factors FF of the gas A and the gas B, respectively. This method, however, has a problem in that the obtained results differ greatly from the actual measurement results.

It is an object of the present invention to solve the above-described problem, to provide a pressure-type flow rate control device for calculating a flow rate of a mixed gas with high accuracy and controlling the flow rate of the mixed gas to attain a desired value by using the calculated value, and to provide a flow rate calculation method and a flow rate control method thereof.

Solution to Problem

To achieve the above-described object, a pressure-type flow rate control device according to an embodiment of the present invention is a pressure-type flow rate control device for calculating a flow rate Q of a mixed gas that passes through an orifice from a flow factor FF, while an upstream pressure $P_1$ of the orifice is maintained at approximately at least twice a downstream pressure $P_2$ of the orifice, the mixed gas consisting of a first gas and a second gas and having a mixture ratio of X:(1−X) between the first gas and the second gas. The pressure-type flow rate control device includes a first processor calculating an average density $\rho_{AV}$, average specific heat ratio $\kappa_{AV}$, and average gas constant $R_{AV}$ of the mixed gas, respectively, by:

$$\rho_{AV} = X \cdot \rho(A) + (1-X) \cdot \rho(B),$$

$$\kappa_{AV} = X \cdot \kappa(A) + (1-X) \cdot \kappa(B), \text{ and}$$

$$R_{AV} = X \cdot R(A) + (1-X) \cdot R(B)$$

using a density $\rho(A)$ of the first gas, a density $\rho(B)$ of the second gas, a specific heat ratio $\kappa(A)$ of the first gas, a specific heat ratio $\kappa(B)$ of the second gas, a gas constant $R(A)$ of the first gas, and a gas constant $R(B)$ of the second gas, a second processor calculating the flow factor FF of the mixed gas by:

$$FF = (k/\rho_{AV}^{1/2})\{2/(\kappa_{AV}+1)\}^{1/(\kappa_{AV}-1)}[\kappa_{AV}/\{(\kappa_{AV}+1)R_{AV}\}]$$

using the average density $\rho_{AV}$, the average specific heat ratio $\kappa_{AV}$, and the average gas constant $R_{AV}$, where k is a constant, and a third processor calculating the flow rate Q of the mixed gas that is output from the orifice by:

$$Q = FF \cdot S \cdot P_1 (1/T_1)^{1/2}$$

using the flow factor FF of the mixed gas, where S is an orifice cross section, and $T_1$ is a temperature of the gas on an upstream side of the orifice.

The above-described pressure-type flow rate control device further includes an adjuster disposed on the upstream side of the orifice and adjusting a supply amount of the mixed gas that is supplied to the orifice, and a controller controlling the supply amount adjusted by the adjuster such that the flow rate Q of the mixed gas that is calculated becomes a predetermined target flow rate $Q_0$.

The above-described pressure-type flow rate control device further includes a storage storing a density, a specific heat ratio, and a gas constant for each of three or more types of gases, and a receiver receiving specification information that specifies the first gas and the second gas from external equipment. The first processor can read out the densities $\rho(A)$ and $\rho(B)$, the specific heat ratios $\kappa(A)$ and $\kappa(B)$, and the gas constants $R(A)$ and $R(B)$ of the gases that correspond to the specification information from the storage, and calculate the average density $\rho_{AV}$, the average specific heat ratio $\kappa_{AV}$, and the average gas constant $R_{AV}$ of the mixed gas.

A flow rate calculation method of a pressure-type flow rate control device according to an embodiment of the present invention is a flow rate calculation method of a pressure-type flow rate control device for calculating a flow rate Q of a mixed gas that passes through an orifice, while maintaining an upstream pressure $P_1$ of the orifice at approximately at least twice a downstream pressure $P_2$ of the orifice, the mixed gas consisting of a first gas and a second gas and having a mixture ratio of X:(1−X) between the first gas and the second gas. The flow rate calculation method includes a first step of calculating an average density $\rho_{AV}$, average specific heat ratio $\kappa_{AV}$, and average gas constant $R_{AV}$ of the mixed gas, respectively, by:

$$\rho_{AV}=X\cdot\rho(A)+(1-X)\cdot\rho(B),$$

$$\kappa_{AV}=X\cdot\kappa(A)+(1-X)\cdot\kappa(B), \text{ and}$$

$$R_{AV}=X\cdot R(A)+(1-X)\cdot R(B)$$

using a density $\rho(A)$ of the first gas, a density $\rho(B)$ of the second gas, a specific heat ratio $\kappa(A)$ of the first gas, a specific heat ratio $\kappa(B)$ of the second gas, a gas constant $R(A)$ of the first gas, and a gas constant $R(B)$ of the second gas, a second step of calculating the flow factor FF of the mixed gas by:

$$FF=(k/\rho_{AV})^{1/2}\{2/(\kappa_{AV}+1)\}^{1/(\kappa_{AV}-1)}[\kappa_{AV}/\{(\kappa_{AV}+1)R_{AV}\}]$$

using the average density $\rho_{AV}$, the average specific heat ratio $\kappa_{AV}$, and the average gas constant $R_{AV}$, where k is a constant, and a third step of calculating the flow rate Q of the mixed gas that is output from the orifice by:

$$Q=FF\cdot S\cdot P_1(1/T_1)^{1/2}$$

using the flow factor FF of the mixed gas, where S is an orifice cross section, and $T_1$ is a temperature of the gas on an upstream side of the orifice.

A flow rate control method of a pressure-type flow rate control device according to an embodiment of the present invention is a flow rate control method of a pressure-type flow rate control device that includes a flow rate adjuster disposed on an upstream side of an orifice through which a mixed gas passes. The flow rate control method includes the steps of calculating a flow rate Q of the mixed gas that passes through the orifice by the flow rate calculation method described above, and adjusting the flow rate adjuster such that the flow rate Q that is calculated becomes a predetermined target flow rate $Q_0$.

Advantageous Effects of Invention

With the pressure-type flow rate control device according to an embodiment of the present invention, the flow rate of the mixed gas can be calculated with high accuracy, and the flow rate of the mixed gas can be controlled with high accuracy to attain a desired value by using the calculated value.

DESCRIPTION OF EMBODIMENTS

Figure 1:
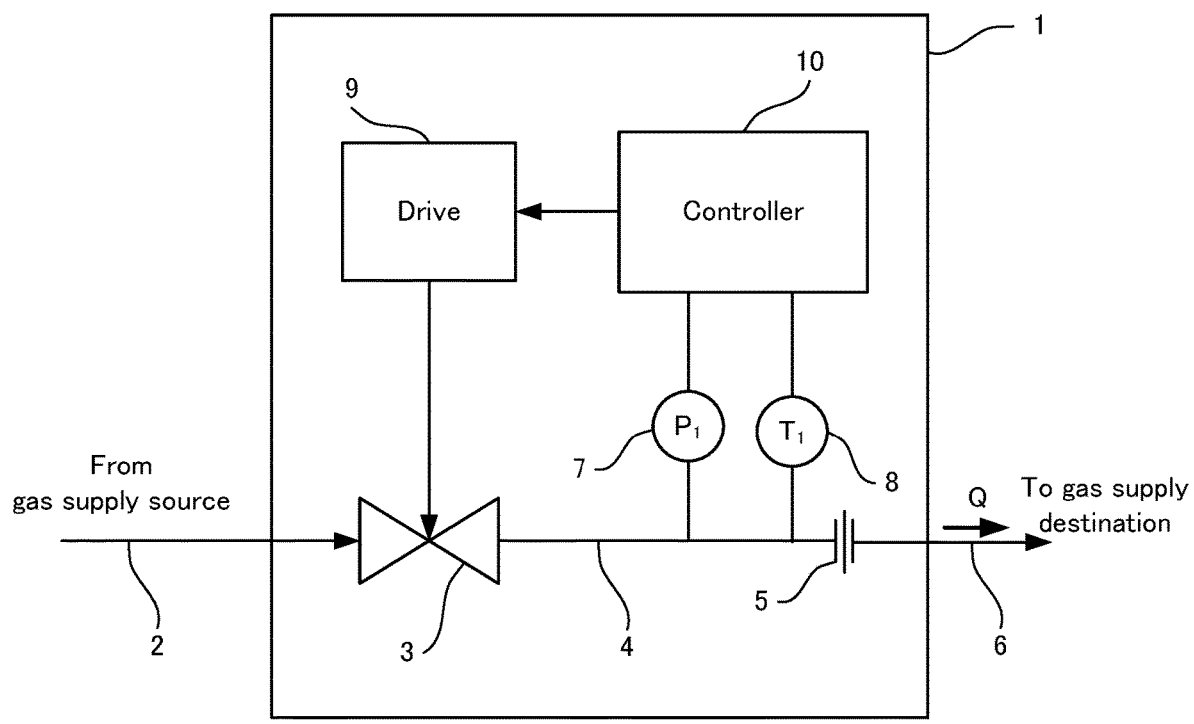
FIG. 1 is a block diagram illustrating a schematic configuration of a pressure-type flow rate control device according to an embodiment of the present invention.

Embodiments of a pressure-type flow rate control device according to the present invention will be described hereinafter with reference to the drawings. Note that the same or similar components are given the same reference numerals throughout all the figures and all the embodiments.

FIG. 1 illustrates a pressure-type flow rate control device according to an embodiment of the present invention. A pressure-type flow rate control device 1 includes a mixed gas supply passage 2, a control valve 3, an upstream flow passage 4, an orifice 5, an exhaust flow passage 6, a pressure sensor 7, a temperature sensor 8, a drive 9, and a controller 10. The control valve 3 is provided as a flow rate adjuster on the upstream side of the orifice 5. Under the control of the driver 9, the control valve 3 controls the amount of gas supplied from the outside of the pressure-type flow rate control device 1 through the mixed gas supply passage 2 and exhausts the gas to the upstream flow passage 4.

The mixed gas supply passage 2, the upstream flow passage 4, and the exhaust flow passage 6 may be formed by pipes, or may be formed inside a main block in which the control valve 3 and other components are mounted. As the control valve 3, a diaphragm, e.g., a direct-touch type metal diaphragm valve may be used. As the drive 9, for example, a piezoelectric element drive (piezoelectric actuator) may be used. The present invention is not limited thereto, and the drive 9 may also be a magnetostrictive drive, a solenoid drive, a motor drive, a pneumatic drive, or a thermal expansion drive.

The orifice 5 controls the flow rate of gas received from the upstream flow passage 4 while throttling the received gas, and outputs the gas to the exhaust flow passage 6 provided on the downstream side. The exhaust flow passage 6 is connected to a device (e.g., reactor) to which the gas is supplied. As the orifice 5, for example, a thin metal plate-like gasket with a hole formed by cutting may be used. Alternatively, an orifice with a hole formed in a metal film by etching or electrical discharge machining can be used. The orifice 5 further includes a flow rate limiter that reduces the aperture of its flow passage with a sonic nozzle or other elements. The flow rate of the gas depends on the orifice 5.

The pressure sensor 7 measures the pressure of the gas in the upstream flow passage 4. For example, a semiconductor strain pressure sensor may be used as the pressure sensor 7. The pressure sensor 7 is not limited thereto, and as the pressure sensor 7, any of other types of pressure sensor, such as a metal-foil strain pressure sensor, an electrical capacitance pressure sensor, or a magneto-resistive pressure sensor may be used.

The temperature sensor 8 measures the temperature of the gas in the upstream flow passage 4. For example, a thermistor is used as the temperature sensor 8. The temperature sensor 8 is not limited thereto, and as the temperature sensor 8, any of various types of commonly known temperature sensors such as a thermocouple temperature sensor or a resistance thermometer bulb temperature sensor may be used.

Figure 2:
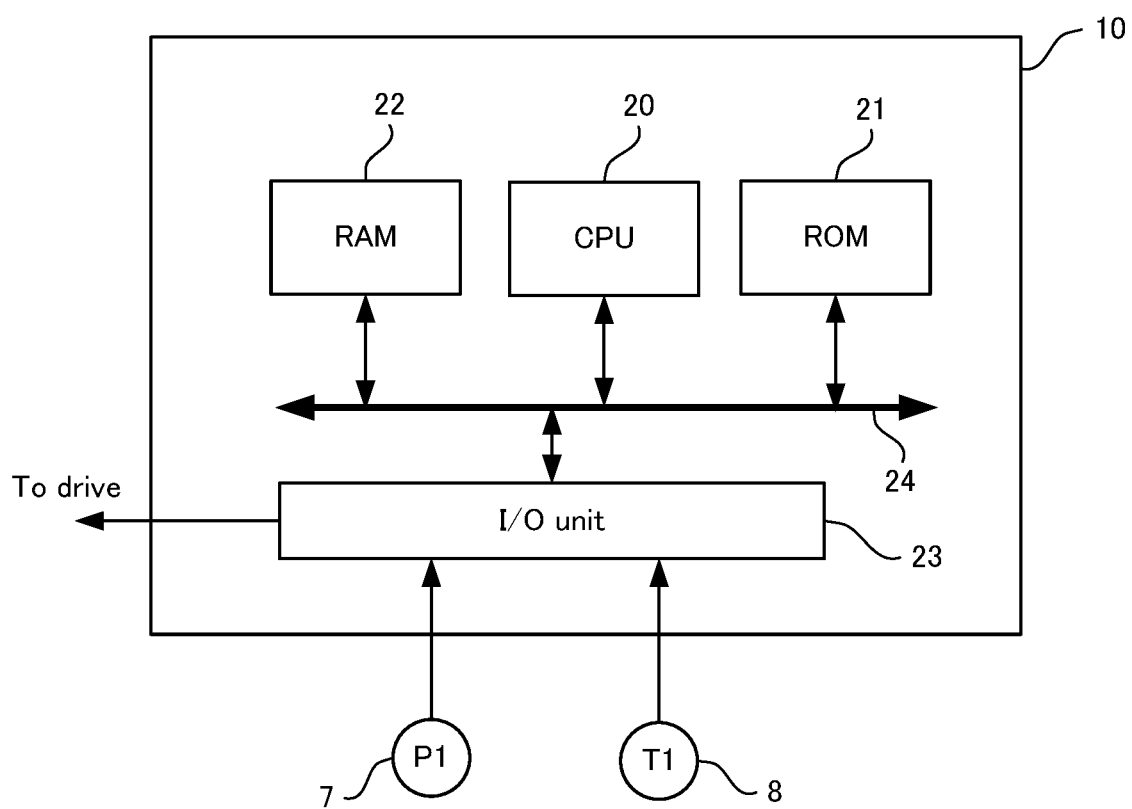
FIG. 2 is a block diagram illustrating an internal configuration of a controller in FIG. 1.

The controller 10 performs overall control of the pressure-type flow rate control device 1. Referring to FIG. 2, the controller 10 includes a CPU (central processing unit) 20, a ROM (read-only memory) 21, a RAM (random access memory) 22, an I/O unit 23, and a bus 24. In FIG. 2, the constituent elements of the pressure-type flow rate control device 1 shown in FIG. 1 other than the pressure sensor 7 and the temperature sensor 8 are not shown.

The CPU 20 implements functions of the pressure-type flow rate control device 1 by executing programs recorded on the ROM 21. The ROM 21 is, for example, a non-volatile electrically writable memory and stores predetermined programs and data (e.g., parameters) that are necessary to execute the programs. The RAM 22 is a volatile memory and is used as a work area used when the CPU 20 executes programs and temporarily stores the values of arithmetic operation results.

The I/O unit 23 serves as an interface for exchanging data with external equipment. The I/O unit 23 includes an A/D converter (not shown) for converting analog signals that are output from the pressure sensor 7 and the temperature sensor 8 into digital signals that can be handled by the CPU 20. The A/D converter generates digital signals in a predetermined cycle and stores the digital signals in a buffer (not shown). Thus, data in the buffer is updated in a predetermined cycle. The data stored in the buffer is read out by the CPU 20 at a predetermined timing and is used in arithmetic operations described later. Note that other components such as an amplifier (amp) for amplifying analog signals output from the pressure sensor 7 and the temperature sensor 8 to a predetermined level may be provided on the input side of the A/D converter. The I/O unit 23 may also output a control signal of the driver 9.

Although not shown, the I/O unit 23 may further include an interface for exchanging information with external equipment such as computers. In this case, programs and data can be written into the ROM 21 via the interface with external equipment. If the I/O unit 23 does not include any interface with external equipment, the ROM 21 may be configured to be detachable so that programs and parameters can be updated by replacing the ROM 21 with a new one. The data in the ROM 21 can also be updated using external equipment.

The bus 24 serves to support data exchange among the CPU 20, the ROM 21, the RAM 22, and the I/O unit 23. Although not shown in FIG. 1 or 2, the pressure-type flow rate control device 1 also includes constituent elements of operational necessity, such as a power supply circuit and a clock signal generator for causing each component to operate in synchronization with other components. Note that the constituent elements (e.g., CPU 20) of the controller 10 do not necessarily have to be configured integrally within the device, and some constituent elements such as the CPU 20 may be configured to be disposed in other places (outside the device) and connected to one another via the bus 24. At this time, a configuration is possible in which not only wired communication but also wireless communication is established between constituent elements inside the device and those outside the device.

This configuration allows the pressure-type flow rate control device 1 to calculate the flow rate Q of a mixed gas supplied from the outside through the mixed gas supply passage 2 and output through the control valve 3 and the orifice 5 to the exhaust flow passage 6, by using the pressure $P_1$ of the mixed gas measured by the pressure sensor 7, and to adjust the control valve 3 by controlling the driver 9 such that the flow rate Q becomes a preset flow rate $Q_0$, when the relationship between the upstream pressure $P_1$ and downstream pressure $P_2$ of the orifice 5 satisfies the critical expansion condition $P_1/P_2 \geq$ approx. 2.

Figure 3:
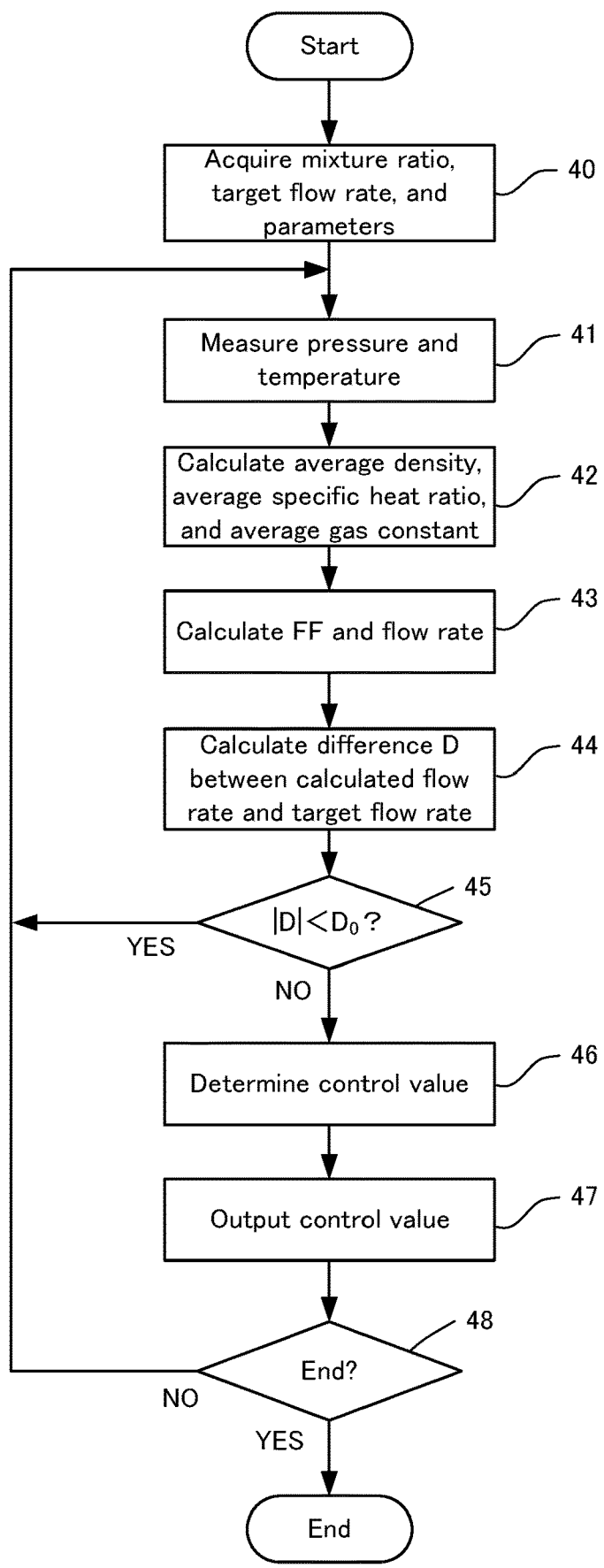
FIG. 3 is a flowchart of operations of the pressure-type flow rate control device in FIG. 1.

The operations of the pressure-type flow rate control device 1 will now be described more specifically with reference to the flowchart in FIG. 3. Each step in the flowchart in FIG. 3 is implemented by the CPU 20 executing a predetermined program read out from the ROM 21 after the pressure-type flow rate control device 1 is powered on.

Here, the mixed gas supplied to the mixed gas supply passage 2 is assumed to be obtained by mixing two types of gases, namely gas A and gas B, at a ratio of X:(1−X). Here, $Q=FF \cdot S \cdot P_1 (1/T_1)^{1/2}$ is used as a calculation formula for the flow rate Q. As parameters necessary for calculating the flow rate Q, the ROM 21 stores the proportion X of the gas A, the respective densities $\rho(A)$ and $\rho(B)$ (kg/m³) of the gas A and the gas B, the gas specific heat ratios $\kappa(A)$ and $\kappa(B)$ (dimensionless), and the gas constants $R(A)$ and $R(B)$ (m/K). The ROM 21 also stores the orifice cross section S (m²) of the orifice 5.

In step 40, the mixture ratio X of the gas A, the target flow rate $Q_0$, the respective densities $\rho(A)$ and $\rho(B)$, the respective gas specific heat ratios $\kappa(A)$ and $\kappa(B)$, and the respective gas constants $R(A)$ and $R(B)$ of the gas A and the gas B are read out from the ROM 21.

In step 41, the pressure sensor 7 measures the pressure of the mixed gas in the upstream flow passage 4, and the temperature sensor 8 measures the temperature of the mixed gas in the upstream flow passage 4. Specifically, the pressure $P_1$ (kg/m²abs) and the temperature $T_1$ (K), which are digital data obtained by A/D conversion of output from the pressure sensor 7 and the temperature sensor 8, are stored in the RAM 22.

In step 42, an average density $\rho_{AV}$, an average specific heat ratio $\kappa_{AV}$ (or κAV), and an average gas constant $R_{AV}$ are calculated by the following equations:

$$\rho_{AV} = X \cdot \rho(A) + (1-X) \cdot \rho(B),$$

$$\kappa_{AV} = X \cdot \kappa(A) + (1-X) \cdot \kappa(B), \text{ and}$$

$$R_{AV} = X \cdot R(A) + (1-X) \cdot R(B).$$

In step 43, the flow factor FF of the mixed gas is calculated by:

$$FF = (k/\rho_{AV})\{2/(\kappa_{AV}+1)\}^{1/(\kappa_{AV}-1)}[\kappa_{AV}/\{(\kappa_{AV}+1) R_{AV}\}]^{1/2}.$$

Then, the flow rate Q (m³/sec) is calculated by $Q = FF \cdot S \cdot P_1 (1/T_1)^{1/2}$, using the calculated flow factor FF, the orifice cross section S read out in step 40, and the pressure P1 and the temperature T1 acquired in step 41.

Here, k is a constant (k=4.429), and the flow factor FF and the flow rate Q are calculated using the average density $\rho_{AV}$, average specific heat ratio $\kappa_{AV}$, and average gas constant $R_{AV}$ of the mixed gas that are calculated in step 42.

In step 44, a difference D between the flow rate Q calculated in step 43 and the target flow rate $Q_0$ read out in step 40 is calculated by $D=Q-Q_0$.

In step 45, it is determined whether the absolute value of D calculated in step 44 is smaller than a predetermined threshold value $D_0$. If the absolute value is smaller than $D_0$, control returns to step 41, and if the absolute value is greater than or equal to $D_0$, control transitions to step 46.

In step 46, a control value for controlling the control valve 3 is determined. The control value is determined according to the magnitude of D. The control value is determined according to the magnitude of D, such that the open/closed state of the control valve 3 is moved in the direction of closing the valve if D is a positive value and is moved in the direction of opening the valve if D is a negative value. Note that the control value can be determined according to the magnitude of D in an arbitrary manner as long as the direction of opening or closing the control valve 3 is correctly set according to whether D is positive or negative. For example, the control value can be changed by a large amount if D is a large value, and can be changed by a small amount if D is a small value. Alternatively, the control value can be changed by a predetermined amount every time, irrespective of the magnitude of D. In either case, the flow rate Q can be set to the target flow rate $Q_0$ by repeating steps 41 to 46.

In step 47, the determined control value is output to the driver 9. Accordingly, the open/closed state of the control valve 3 is adjusted.

In step 48, it is determined whether an end instruction has been issued. If an end instruction has been received, control ends, and if not, control returns to step 41. For example, an end instruction is issued upon power-off.

In this way, the flow rate Q of the mixed gas output from the exhaust flow passage 6 of the pressure-type flow rate control device 1 can be adjusted to the target value $Q_0$.

As the flow factor FF, a ratio (hereinafter, also referred to as a "relative FF") of the flow factor FF of the mixed gas to the flow factor FF of reference gas (e.g., nitrogen ($N_2$)) can also be used. In the case of using the relative FF, the actual flow rate of the mixed gas may be calculated by multiplying the calculated flow rate Q by the flow rate of the reference gas.

Although the case has been described above in which the mixture ratio of the mixed gas (specifically, the proportion X of the gas A that is mixed) is stored in the ROM 21, the present invention is not limited thereto. The mixture ratio may be input from external equipment to the controller 10 via the I/O unit 23.

Although the case has been described above in which parameters (gas densities, gas specific heat ratios, and gas constants) of two predetermined types of gases are stored in the ROM 21, the present invention is not limited thereto. Parameters (gas densities, gas specific heat ratios, gas constants) of three or more types of gases may be stored in the ROM 21. In that case, the flow rate can be controlled in a similar manner to that described above for a mixed gas that is obtained by mixing two arbitrary types of gases stored in the ROM 21 at an arbitrary mixture ratio, by inputting information on the type of mixed gas supplied from the outside and the mixture ratio thereof from external equipment to the controller 10.

The configuration of the controller 10 is not limited to the configuration illustrated in FIG. 2. Components such as the CPU 20, the ROM 21, and the RAM 22 may be configured as individual semiconductor elements, or all or some of them may be configured integrally as one semiconductor element by an ASIC (application specific integrated circuit).

EXAMPLES

Experimental results are hereinafter presented to show the effectiveness of the present invention.

A device with the same configuration as in FIG. 1 was prepared. Then, a mixed gas, i.e., a mixture of two types of gases, was input to the control valve 3 and exhausted through the predetermined orifice 5, and the pressure $P_1$ and temperature $T_1$ of the gas in the upstream flow passage 4 were obtained by actual measurement to calculate the flow factor FF as described above. On the other hand, the flow rate Q of the same mixed gas was obtained by actual measurement using a commonly known buildup method, and the measured value was used to calculate the flow factor FF by $Q=FF \cdot S \cdot P_1(1/T_1)^{1/2}$.

Table 1 shows the experimental results for various mixed gases.

TABLE 1

| | FF | | | Actual Gas Data Obtained by Buildup | | | Error | |
| | | | | | $N_2$ | Actual | Actually | | |
| Gas | Calculation | Multiplication | Range | (sccm) | Gas (sccm) | Measured FF | Calculation | Multiplication |
|---|---|---|---|---|---|---|---|---|
| 5% $B_2H_6/H_2$ | 2.928243 | 3.595328 | F600 | 599.77 | 1740.81 | 2.902440 | −0.88% | −19.27% |
| | 2.928243 | 3.595328 | F200 | 200.04 | 578.36 | 2.891159 | −1.27% | −19.59% |
| 10% $GeH_4/H_2$ | 1.716706 | 3.401369 | F600 | 599.77 | 1023.95 | 1.707221 | −0.55% | −49.81% |
| | 1.716706 | 3.401369 | F200 | 200.04 | 341.65 | 1.707888 | −0.51% | −49.79% |
| 20% $F_2/Ar$ | 0.878206 | 0.882077 | F600 | 599.49 | 522.85 | 0.872162 | −0.69% | −1.12% |
| | 0.878206 | 0.882077 | F200 | 199.91 | 174.36 | 0.872180 | −0.69% | −1.12% |
| | 0.878206 | 0.882077 | F1600 | 1600.48 | 1393.33 | 0.870565 | −0.87% | −1.31% |
| 20% $F_2/N_2$ | 0.966300 | 0.971826 | F600 | 599.77 | 578.80 | 0.965037 | −0.13% | −0.70% |
| | 0.966300 | 0.971826 | F200 | 200.04 | 192.86 | 0.964104 | −0.23% | −0.79% |
| | 0.966300 | 0.971826 | F5L | 4999.99 | 4819.29 | 0.963860 | −0.25% | −0.82% |
| 5% $Si_2H_6/Ar$ | 0.870116 | 0.876378 | F130 | 129.64 | 110.74 | 0.854198 | −1.83% | −2.53% |
| 20% $B_2H_6/H_2$ | 1.991671 | 3.185782 | F20 | 20.10 | 39.35 | 1.957740 | −1.70% | −38.55% |
| | 1.991671 | 3.185782 | F200 | 200.10 | 387.27 | 1.935380 | −2.83% | −39.25% |

The leftmost "Gas" column of Table 1 shows a first gas and the proportion thereof on the left side of the forward slash (/) and a second gas on the right side of the forward slash. The proportion (%) of the second gas is obtained by subtracting the proportion of the first gas from 100. For example, "5% $B_2H_6/H_2$" represents a mixed gas that contains 5% $B_2H_6$ and 95% $H_2$.

The "Calculation" column within the "FF" column shows the value of the flow factor FF calculated by the method according to the present invention. Here, FF refers to the relative FF. As described above, the average density $\rho_{AV}$, average specific heat ratio $\kappa_{AV}$, and average gas constant $R_{AV}$ of the mixed gas were calculated, and these values were used to calculate the relative FF by:

$$FF=(k/\rho_{AV})\{2/(\kappa_{AV}+1)\}^{1/(\kappa_{AV}-1)}[\kappa_{AV}/\{(\kappa_{AV}+1)R_{AV}\}]^{1/2}$$

The "Multiplication" column within the "FF" column shows the value calculated by $FF(AB)=X \cdot FF(A)+(1-X) \cdot FF(B)$ using the relative FF in Table 2.

TABLE 2

| Gas | Relative FF |
|---|---|
| $B_2H_6$ | 1.001537 |
| $H_2$ | 3.731843 |
| $GeH_4$ | 0.427103 |
| $F_2$ | 0.859129 |
| $N_2$ | 1 |
| Ar | 0.887814 |
| $Si_2H_6$ | 0.659087 |

The "Range" column shows the rated flow rate and includes information for specifying the orifice cross section. The orifice cross section that corresponds to each rated flow rate was used to calculate the flow factor FF by the buildup method. Here, F600, F200, F1600, F5L, F130, and F20 each represents the flow rate of $N_2$ gas. For example, F600 represents 600 SCCM.

The "$N_2$" column shows the flow rate of nitrogen gas used as a reference gas. The "Actual Gas" column shows the measured value of the mixed gas obtained by the buildup method. The "Actually Measured FF" column shows the relative FF calculated from the actually measured values of the mixed gas.

The "Calculation" column within the "Error" column shows the value obtained by subtracting the value in the "Calculation" column of the "FF" column from the value in the "Actually Measured FF" column and dividing the subtraction value by the value in the "Actually Measured FF" column. Similarly, the "Multiplication" column within the "Error" column shows the value obtained by subtracting the value in the "Multiplying" column of the "FF" column from the value in "Actually Measured FF" column and dividing the subtraction value by the value in the "Actually Measured FF" column.

Comparison of these values indicates that, for every mixed gas, the relative FF calculated by the method according to the present invention has a smaller error, and the relative FF can be calculated with high accuracy. In particular, even if there is a large difference in relative FF between the two types of gases that are mixed, the relative FF was calculated with high accuracy. This verifies the effectiveness of the present invention.

Note that the types of gases to which the present invention is applicable are not limited to those shown in Tables 1 and 2.

While the present invention has been described above by describing embodiments thereof, the above-described embodiments are merely illustrative. The present invention is not limited to the above-described embodiments and can be implemented with various modifications.

REFERENCE SIGNS LIST

1 Pressure-type flow rate control device
2 Mixed gas supply passage
3 Control valve
4 Upstream flow passage
5 Orifice
6 Exhaust flow passage
7 Pressure sensor
8 Temperature sensor
9 Drive
10 Controller
20 CPU
21 ROM
22 RAM
23 I/O unit
24 Bus

The invention claimed is:

1. A pressure-type flow rate control device for calculating a flow rate Q of a mixed gas that passes through an orifice from a flow factor FF, while an upstream pressure $P_1$ of the orifice is maintained at approximately at least twice a downstream pressure $P_2$ of the orifice, the mixed gas consisting of a first gas and a second gas and having a mixture ratio representing the volume ratio of X:(1−X) between the first gas and the second gas, the pressure-type flow rate control device comprising:

a first processor calculating an average density $\rho_{AV}$, average specific heat ratio $\kappa_{AV}$, and average gas constant RAY of the mixed gas, respectively, by:

$$\rho_{AV}=X \cdot \rho(A)+(1-X) \cdot \rho(B),$$

$$\kappa_{AV}=X \cdot \kappa(A)+(1-X) \cdot \kappa(B), \text{ and}$$

$$R_{AV}=X \cdot R(A)+(1-X) \cdot R(B)$$

using a density $\rho(A)$ of the first gas, a density $\rho(B)$ of the second gas, a specific heat ratio $\kappa(A)$ of the first gas, a specific heat ratio $\kappa(B)$ of the second gas, a gas constant $R(A)$ of the first gas, and a gas constant $R(B)$ of the second gas;

a second processor calculating the flow factor FF of the mixed gas by:

$$FF=(k/\rho_{AV})\{2/(\kappa_{AV}+1)\}^{1/(\kappa_{AV}-1)}[\kappa_{AV}/\{(\kappa_{AV}+1)R_{AV}\}]^{1/2}$$

using the average density $\rho_{AV}$, the average specific heat ratio $\kappa_{AV}$, and the average gas constant $R_{AV}$, where k is a constant;

a third processor calculating the flow rate Q of the mixed gas that is output from the orifice by:

$$Q=FF \cdot S \cdot P_1(1/T_1)^{1/2}$$

using the flow factor FF of the mixed gas, where S is an orifice cross section, and $T_1$ is a temperature of the gas on an upstream side of the orifice;

an adjuster disposed on the upstream side of the orifice and adjusting a supply amount of the mixed gas that is supplied to the orifice; and a controller controlling the supply amount adjusted by the adjuster such that the flow rate Q of the mixed gas that is calculated becomes a predetermined target flow rate $Q_0$.

2. The pressure-type flow rate control device according to claim 1, further comprising:

a storage storing a density, a specific heat ratio, and a gas constant for each of three or more types of gases; and a receiver receiving specification information that specifies the first gas and the second gas from external equipment, wherein the first processor reads out the densities ρ(A) and ρ(B), the specific heat ratios κ(A) and κ(B), and the gas constants R(A) and R(B) of the gases that correspond to the specification information from the storage, and calculates the average density $\rho_{AV}$, the average specific heat ratio $\kappa_{AV}$, and the average gas constant $R_{AV}$ of the mixed gas.

3. A flow rate calculation method of a pressure-type flow rate control device for calculating a flow rate Q of a mixed gas that passes through an orifice, while maintaining an upstream pressure $P_1$ of the orifice at approximately at least twice a downstream pressure $P_2$ of the orifice, the mixed gas consisting of a first gas and a second gas and having a mixture ratio representing the volume ratio of X:(1−X) between the first gas and the second gas, the method comprising:

a first step of calculating an average density $\rho_{AV}$, average specific heat ratio $\kappa_{AV}$, and average gas constant $R_{AV}$ of the mixed gas, respectively, by:

$\rho_{AV} = X \cdot \rho(A) + (1-X) \cdot \rho(B)$, $\kappa_{AV} = X \cdot \kappa(A) + (1-X) \cdot \kappa(B)$, and $R_{AV} = X \cdot R(A) + (1-X) \cdot R(B)$ using a density ρ(A) of the first gas, a density ρ(B) of the second gas, a specific heat ratio κ(A) of the first gas, a specific heat ratio κ(B) of the second gas, a gas constant R(A) of the first gas, and a gas constant R(B) of the second gas;

a second step of calculating the flow factor FF of the mixed gas by:

$FF = (k/\rho_{AV}^{1/2})\{2/(K_{AV}+1)\}^{1/(\kappa_{AV}-1)}[\kappa_{AV}/\{(\kappa_{AV}+1)R_{AV}\}]$ using the average density $\rho_{AV}$, the average specific heat ratio $\kappa_{AV}$, and the average gas constant $R_{AV}$, where k is a constant;

a third step of calculating the flow rate Q of the mixed gas that is output from the orifice by:

$Q = FF \cdot S \cdot P_1 (1/T_1)^{1/2}$ using the flow factor FF of the mixed gas, where S is an orifice cross section, and $T_1$ is a temperature of the gas on an upstream side of the orifice;

a step of adjusting, on the upstream side of the orifice, a supply amount of the mixed gas that is supplied to the orifice; and a step of controlling the adjusted supply amount adjusted such that the flow rate Q of the mixed gas that is calculated becomes a predetermined target flow rate $Q_0$.

4. A flow rate control method of a pressure-type flow rate control device that includes a flow rate adjuster disposed on an upstream side of an orifice through which a mixed gas passes, the flow rate control method comprising the steps of:

calculating a flow rate Q of the mixed gas that passes through the orifice by the flow rate calculation method according to claim 3; and adjusting the flow rate adjuster such that the flow rate Q that is calculated becomes a predetermined target flow rate $Q_0$.

* * * * *